United States Patent
Grasso et al.

(10) Patent No.: US 6,207,308 B1
(45) Date of Patent: Mar. 27, 2001

(54) WATER TREATMENT SYSTEM FOR A FUEL CELL ASSEMBLY

(75) Inventors: Albert P. Grasso, Vernon; Leslie L. Van Dine, Manchester, both of CT (US)

(73) Assignee: International Fuel Cells, LLC, South Windsor, CT (US)

(*) Notice: Subject to any disclaimer, the term of this patent is extended or adjusted under 35 U.S.C. 154(b) by 0 days.

(21) Appl. No.: 09/295,732

(22) Filed: Apr. 20, 1999

(51) Int. Cl.$^7$ .................................................. H01M 8/04
(52) U.S. Cl. ................................................. 429/26; 429/49
(58) Field of Search ................................ 429/12, 13, 26, 429/49, 81

(56) References Cited

U.S. PATENT DOCUMENTS

| | | | |
|---|---|---|---|
| 3,969,145 | 7/1976 | Grevstad et al. | 136/86 |
| 3,994,748 | 11/1976 | Kunz et al. | 429/13 |
| 4,233,369 | 11/1980 | Breault et al. | 429/26 |
| 4,344,850 | 8/1982 | Grasso | 210/664 |
| 4,769,297 | 9/1988 | Reiser et al. | 429/17 |
| 4,801,356 | 1/1989 | Grasso | 203/11 |
| 4,804,591 | 2/1989 | Grasso et al. | 429/12 |
| 4,816,040 | 3/1989 | Bonville et al. | 55/42 |
| 4,835,072 | * 5/1989 | Grasso et al. | |
| 4,855,192 | * 8/1989 | Grasso | |
| 4,973,529 | 11/1990 | Grasso et al. | 429/12 |
| 4,994,331 | * 2/1991 | Cohen | |
| 5,344,721 | * 9/1994 | Sonai et al. | |
| 5,366,818 | * 11/1994 | Wilkinson et al. | |
| 5,503,944 | 4/1996 | Meyer et al. | 429/13 |
| 5,980,716 | * 11/1999 | Horinouchi et al. | |

* cited by examiner

Primary Examiner—Stephen Kalafut
Assistant Examiner—Susy Tsang
(74) Attorney, Agent, or Firm—McCormick, Paulding & Huber LLP (57) ABSTRACT

A water treatment system for a fuel cell stack, wherein a degassifier provides for interaction between an oxidant and a coolant which has circulated throughout the fuel cell stack so that dissolved gases within the circulated coolant are removed.

18 Claims, 6 Drawing Sheets

WATER TREATMENT SYSTEM FOR A FUEL CELL ASSEMBLY

FIELD OF THE INVENTION

This invention relates in general to a water treatment system for a fuel cell assembly, and deals more particularly with a system by which a fuel cell assembly may avoid operational failure, due to contamination of the water therein, through a degasification process.

BACKGROUND OF THE INVENTION

Electrochemical fuel cell assemblies are known for their ability to produce electricity and a subsequent reaction product through the interaction of a fuel being provided to an anode and an oxidant being provided to a cathode, thereby generating a current flow between these electrodes. Such fuel cell assemblies are very useful and sought after due to their high efficiency, as compared to internal combustion fuel systems and the like. Fuel cell assemblies are additionally advantageous due to the environmentally friendly chemical reaction by-products that are produced, such as water. In order to control the temperature within the fuel cell assembly, a coolant is provided to circulate about a fuel cell assembly, usually water. The use of reformed fuels within fuel cell assemblies makes them particularly sensitive to possible water contaminants.

Electrochemical fuel cell assemblies typically employ hydrogen as the fuel and oxygen as an oxidant where, as noted above, the reaction by-product is water. Such fuel cell assemblies employ a membrane consisting of a solid polymer electrolyte, or ion exchange membrane, disposed between the two electrodes formed of porous, electrically conductive sheet material—typically carbon fiber paper. The ion exchange membrane is also known as a proton exchange membrane (hereinafter PEM), such as sold by DuPont under the trade name NAFION™, and has a catalyst layer formed thereon at the membrane-electrode interface so as to promote the desired electrochemical reaction.

In operation, hydrogen fuel permeates the porous electrode material of the anode and reacts with the catalyst layer to form hydrogen ions and electrons. The hydrogen ions migrate through the membrane to the cathode and the electrons flow through an external circuit to the cathode. At the cathode, the oxygen-containing gas supply also permeates through the porous electrode material and reacts with the hydrogen ions and the electrons from the anode at the catalyst layer to form the by-product water. Not only does the ion exchange membrane facilitate the migration of these hydrogen ions from the anode to the cathode, but the ion exchange membrane also acts to isolate the hydrogen fuel from the oxygen-containing gas oxidant. The reactions taking place at the anode and cathode catalyst layers are represented by the equations:

Anode reaction: $H_2 \rightarrow 2H^+ + 2e$

Cathode reaction: $\tfrac{1}{2}O_2 + 2H^+ + 2e \rightarrow H_2O$

Conventional fuels cells have the ion exchange membrane positioned between two gas-permeable, electrically conductive plates, referred to as the anode and cathode plates. The plates are typically formed from graphite, a graphite-polymer composite, or the like. The plates act as a structural support for the two porous, electrically conductive electrodes, as well as serving as current collectors and providing the means for carrying the fuel and oxidant to the anode and cathode, respectively. They are also utilized for carrying away the reactant by-product water during operation of the fuel cell.

When flow channels are formed within these plates for the purposes of feeding either fuel or oxidant to the anode and cathode plates, they are referred to as fluid flow field plates. These plates may also function as water transfer plates in certain fuel cell configurations. When these plates simply overlay channels formed in the anode and cathode porous material, they are referred to as separator plates. Moreover, the plates may have formed therein reactant feed manifolds which are utilized for supplying fuel to the anode flow channels or, alternatively, oxidant to the cathode flow channels. They also have corresponding exhaust manifolds to direct unreacted components of the fuel and oxidant streams, and any water generated as a by-product, from the fuel cell. Alternatively, the manifolds may be external to the fuel cell itself, as shown in commonly owned U.S. Pat. No. 3,994,748 issued to Kunz et al. and incorporated herein by reference in its entirety.

The catalyst layer in a fuel cell assembly is typically a carbon supported platinum or platinum alloy, although other noble metals or noble metal alloys may be utilized. Multiple electrically connected fuel cells consisting of two or more anode plate/membrane/cathode plate combinations are referred to as a fuel cell stack. A fuel cell stack is typically electrically connected in series.

Recent efforts at producing the fuel for fuel cell assemblies have focused on utilizing impure hydrogen produced from the chemical conversion of hydrocarbon fuels, such as methane, natural gas, gasoline or the like, into hydrogen. This process requires that the hydrogen produced must be efficiently converted to be as pure as possible, thereby ensuring that a minimal amount of carbon monoxide and other undesirable chemical byproducts are produced. This conversion of hydrocarbons is generally accomplished through the use of a steam reformer. Reformed hydrocarbon fuels frequently contain quantities of ammonia, $NH_3$, as well as significant quantities of carbon dioxide, $CO_2$. These gases tend to dissolve and dissociate into the water which is provided to, and created within, the fuel cell assembly. The resultant contaminated water supply may cause the conductivity of the water to increase to a point where shunt current corrosion occurs in the coolant channels and manifold leading to degradation of fuel cell materials, as well as reducing the conductivity of the PEM and thereby reducing the efficiency of the fuel cell assembly as a whole.

As disclosed above, the anode and cathode plates provide coolant channels for the circulation of a water coolant, as well as for the wicking and carrying away of excessive water produced as a by-product of the fuel cell assembly operation. The water so collected and circulated through a fuel cell assembly in the coolant channels is susceptible to water contamination and may therefore damage and impair the operation of the fuel cell assembly as the contaminated water circulates throughout the fuel cell assembly.

It is therefore necessary to provide a system which may protect the fuel cell assembly from water contamination, such as is described in commonly owned U.S. Pat. No. 4,344,850 issued to Grasso and incorporated herein by reference in its entirety. Grasso's system for treating the coolant supply of a fuel cell assembly, as illustrated in FIG. 1 of U.S. Pat. No. 4,344,850, utilizes a filter and demineralizer for purifying a portion of the coolant supplied to the fuel cell assembly. A deaerator is also utilized to process the condensed water obtained from a humidified cathode exit stream. As discussed in Grasso, the heat exchange occurring between the coolant stream and the body of the fuel cell assembly is accomplished according to commonly assigned U.S. Pat. No. 4,233,369 issued to Breault et al., incorporated herein by reference in its entirety. It is important to note that Grasso's coolant system does not provide for the cleansing of the coolant stream as a whole. This is due to the fact that the coolant conduits in Grasso, being fashioned from copper or the like, are not in diffusable communication with the body of the fuel cell assembly and as such, the coolant stream does not receive contamination from, inter alia, the $CO_2$ or $NH_3$ present in the reformed fuel stream. The burden of cleansing the coolant stream in Grasso is therefore born solely by the filter and demineralizer and results in greater wear on these components and hence greater repairs and replacements. Grasso also utilizes two distinct coolant pumps for circulating the coolant.

With the forgoing problems and concerns in mind, it is the general object of the present invention to provide a fuel cell assembly with a water treatment system which overcomes the above-described drawbacks.

SUMMARY OF THE INVENTION

It is an object of the present invention to provide a water treatment system for a fuel cell assembly.

It is another object of the present invention to reduce the levels of contaminants within the water circulating throughout a fuel cell assembly.

It is another object of the present invention to provide a water treatment system which also humidifies the oxidant flows to the cathode of a fuel cell assembly.

It is another object of the present invention to reduce the possibility of contaminating gas build-up within the coolant flows.

According to one embodiment of the present invention, a fuel cell stack has a plurality of electrochemical fuel cell assemblies being in electrical connection with each other, the fuel cell assemblies each having an electrolyte, an anode and a cathode. The anode and the cathode are each adapted to support anode and cathode flow field plates through which a supply of fuel and oxidant are fed to the anode and the cathode, respectively. In addition, one of the anode and the cathode flow field plates are adapted to support a coolant channel having coolant inlet and exhaust manifolds through which a supply of coolant is circulated.

A coolant conduit is utilized for exhausting the circulated coolant from the fuel cell stack, while an oxidant source generator provides the fuel cell stack with the oxidant.

In operation, a degasifying apparatus, including a coolant exit conduit and an oxidant exit conduit, treats the circulated coolant from the coolant conduit together with the oxidant from the oxidant source generator so as to remove contaminants from the circulated coolant. The degasifying apparatus subsequently provides the fuel cell stack with treated coolant and oxidant.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
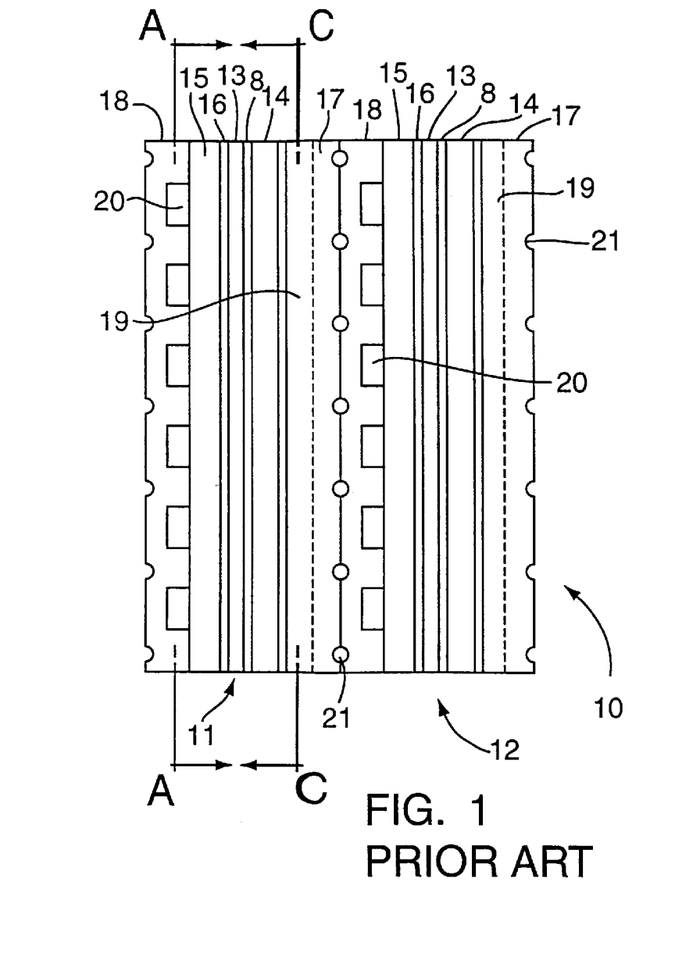
FIG. 1 illustrates a section taken through two PEM fuel cells arranged in series, according to one embodiment of the present invention.

FIG. 1 illustrates a sectional view of a partial fuel cell stack 10 having two electrochemical fuel cell assemblies, 11 and 12, arranged in series contact. Each fuel cell assembly, 11 and 12, produces only approximately 0.6–0.7 V. In order to produce a desired power supply it is necessary for a great many fuel cells to be electrically joined together. The fuel cell assemblies 11 and 12 each employ an ion exchange membrane 13 consisting of a solid polymer electrolyte disposed between an anode electrode substrate 15 and a cathode electrode substrate 14. The ion exchange membrane 13 is also referred to as a proton exchange membrane (PEM) and can be a plastic-type film approximately 0.001 inch thick. The cathode and the anode electrode substrates, 14 and 15 respectively, are formed of porous, electrically conductive sheet material—typically carbon fiber paper having a Teflon® coating.

The ion exchange membrane 13 has a catalyst layer formed on either side of the membrane 13, thereby forming a catalyst-membrane interface which acts to promote the desired electrochemical reaction. The anode catalyst 16 and the cathode catalyst 8 are typically chosen from one of the noble metals, such as platinum, or a noble metal alloy, such as platinum-ruthenium, or the like. The anode electrode substrate 15 in the fuel cell 11 and the cathode electrode substrate 14 in the fuel cell 12 are then electrically coupled in order to provide a path for conducting electrons between the fuel cells 11 and 12 when an external load is applied.

Still in reference to FIG. 1, fuel is supplied to the anode electrode substrate 15 through the fuel channels 20 formed within an anode flow field plate 18, while an oxidant is supplied to the oxidant channels 19 within a cathode flow field plate 17. The fuel and oxidant together are referred to as reactants. The fuel channels 20 are typically arranged approximately orthogonal to the oxidant channels 19. The fuel channels 20 and oxidant channels 19 may be engraved, milled or molded in the surface of the anode or cathode flow field plates, 18 and 17 respectively, and may be one continuous channel or a plurality of channels. In addition, the fuel and oxidant may be fed through the fuel cell stack 10 utilizing axial feed manifolding, exterior manifolding or a combination of the two—the specific arrangement of manifolding being commonly known to those skilled in the art and not of primary concern with respect to the present invention.

The anode and cathode flow field plates, 18 and 17, are formed from a porous graphite or a porous graphite-polymer composite, as discussed previously. While the pore size of each of the plates 18 and 17 may differ, typical pore diameters in the plates 18 and 17 range from approximately 1 micrometer to approximately 5 micrometers. Alternatively, a fuel cell 11 wherein only one of the anode and cathode flow field plates, 18 and 17 respectively, is porous, is also contemplated and may be employed without departing from the broader aspects of the present invention.

In operation, hydrogen fuel permeates the porous electrode material of the anode electrode substrate 15 and reacts at the anode catalyst 16 to form protons and electrons. The protons migrate through the membrane 13 to the cathode electrode substrate 14. The electrons produced at the anode electrode substrate 15 in the fuel cell 12 migrate to the cathode electrode substrate 14 in the fuel cell 11, through both the anode flow field plate 18 of the fuel cell 12 and the cathode flow field plate 17 of the fuel cell 11. At the cathode 14, the oxidant also permeates through the porous electrode material and reacts with the hydrogen ions and the electrons at the catalyst layer 8 to form the by-product water. Not only does the ion exchange membrane 13 facilitate the migration of these hydrogen ions from the catalyst layer 16 to the catalyst layer 8, but the ion exchange membrane 13 also acts to isolate the hydrogen fuel coursing through fuel channels 20 from the oxygen-containing gas oxidant as it moves through the oxidant channels 19. A coolant, typically water, is supplied to the fuel cells 11 and 12 through coolant channels 21 formed in the anode and cathode flow field plates, 18 and 17 respectively, for the purpose of relieving the fuel cells 11 and 12 of excess heat generated by the electrochemical reaction taking place within fuel cells 11 and 12, as well as for humidifying the reactants and providing for the removal of by-product water. Alternatively, a fuel cell 11 wherein only one of the anode and cathode flow field plates, 18 and 17 respectively, has coolant channels 21 formed therein, is also contemplated and may be employed without departing from the broader aspects of the present invention.

While a proton exchange membrane, noble metal catalyst and carbon fiber paper having a Teflon® coating have been described, the present invention is not limited in this regard as other membranes and electrode materials may be alternatively utilized, providing they allow for the necessary flow of reactant and by-product molecules and ions. Likewise, fuel cells having an non-solid acid based electrolyte or other fuel cell configurations, such as are disclosed in commonly assigned U.S. Pat. No. 4,769,297 issued to Reiser et al. and U.S. Pat. No. 5,503,944 issued to Meyer et al. herein incorporated by reference in their entirety, may also be employed without departing from the broader aspects of the present invention.

Figure 2:
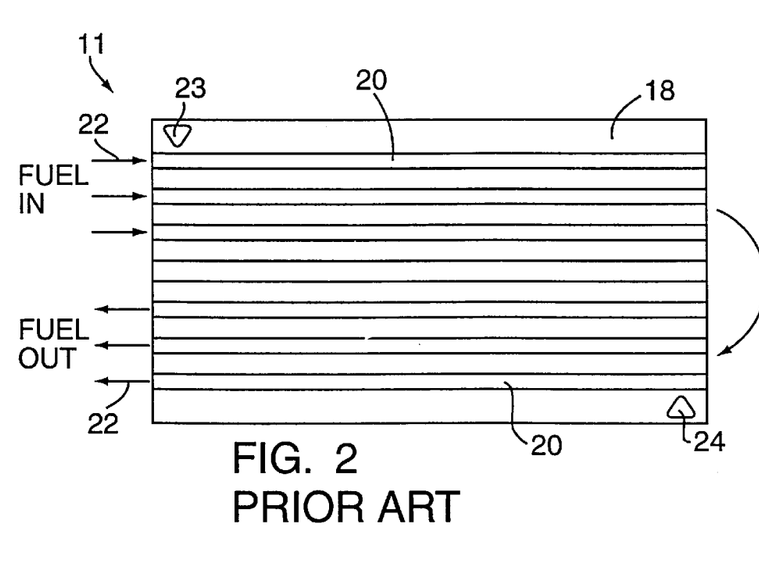
FIG. 2 is a simplified plan illustration of an anode side of a fuel cell, taken in section along line A of FIG. 1.

FIG. 2 illustrates a section taken along line A of FIG. 1 showing a plan view of the anode side of, for example, the fuel cell 11, including the fuel channels 20 of the anode flow field plate 18. As can be seen from FIG. 2, a fuel supply 22 is supplied to one half of the fuel cell 11 and travels the length of the fuel channels 20. As the fuel supply 22 exits fuel cell 11, the fuel supply 22 is directed towards the downstream side of the fuel cell 11 by an unillustrated fuel turn manifold. In this way, the fuel supply 22 is exposed to the entire anode side of the fuel cell 11. It should be readily apparent that were the single fuel cell 11 but one in a stack of fuel cells, one half of each fuel cell so stacked would receive the fuel supply 22 initially, while the other half of each fuel cell in the stack would receive fuel supply 22 after redirection by the unillustrated fuel turn manifold. Additionally, FIG. 2 shows axial inlet and exhaust coolant manifolds, 23 and 24 respectively, which are utilized for supplying a water coolant to a plurality of coolant channels 21. The architecture of FIG. 2 represents a two-pass flow system owing to the fuel supply 22 making two passes across the surface of the fuel cell 11. A greater number of passes may also be arranged with a corresponding increase in fuel turn manifolds, as is known to those so skilled in the art.

Figure 3:
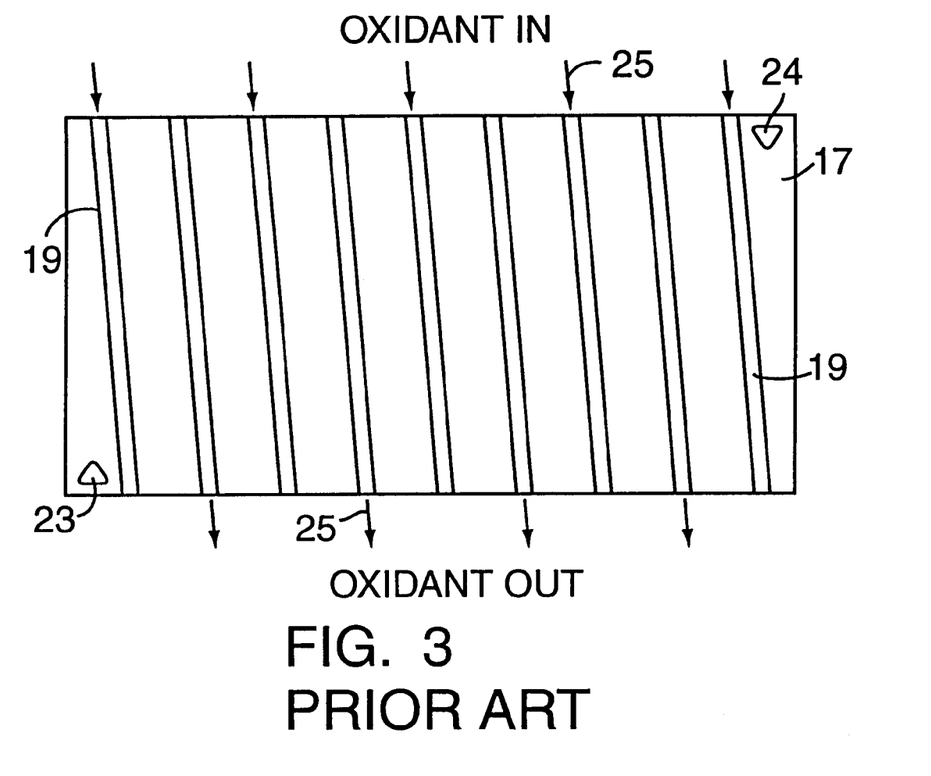
FIG. 3 is a simplified plan illustration of an cathode side of a fuel cell, taken in section along line C of FIG. 1.

FIG. 3 illustrates a section taken along line C of FIG. 1 showing a plan view of the cathode side of, for example, the fuel cell 11, including the oxidant channels 19 of the cathode flow field plate 17. As can be seen from FIG. 3, an oxidant stream 25 is supplied to one entire side of the fuel cell 11 and travels the length of the oxidant channels 19 until emerging at the far side thereof. In this way the entire cathode side of the fuel cell 11 is exposed to the oxidant stream 25 without the use of an oxidant turn manifold. It should be readily apparent, however, that the oxidant fuel stream 25 may also be configured to incorporate an oxidant turn manifold to produce an oxidant flow pattern similar to the fuel supply pattern as illustrated in FIG. 2. Additionally, FIG. 3 also shows axial inlet and exhaust coolant manifolds, 23 and 24 respectively, which are utilized for supplying a coolant such as water to a plurality of coolant channels 21.

It should be readily apparent that the anode and cathode flow field plates, 18 and 17, may alternatively have any number of fuel and oxidant channels, linear or not, as long as the fuel cell 11 is adequately supplied with these reactants.

With reference once again to FIG. 1, the present invention is directed towards a system for treating the water circulating within the fuel cell stack 10. The coolant channels 21 of the fuel cell stack 10 serve to address two main concerns of an operating fuel cell assembly. These two concerns are the water management of a fuel cell assembly, as well as the thermal management of a fuel cell assembly. In a PEM fuel cell assembly, for example the fuel cell assembly 11 as shown in FIG. 1, the PEM 13 must be sufficiently hydrated for the fuel cell assembly 11 to operate and continue to facilitate the migration of ions across the PEM 13. One manner in which the PEM 13 remains hydrated during operation of the fuel cell assembly 11 is by humidifying both the inputted fuel and oxidant streams traveling within the fuel and oxidant channels 20 and 19, respectively. In connection with the hydrogen ions migrating across the PEM 13, as discussed previously, a phenomenon called proton drag takes place causing the water contained within the PEM 13 to be dragged through the PEM 13 from the anode side to the cathode side of the PEM 13. Water is supplied to the anode side of the PEM 13 by evaporation from the anode flow field plate 18, thereby providing a measured amount of hydration for the PEM 13.

The proton dragging of water molecules across the PEM 13 acts to dehydrate the PEM 13 to some extent, while it also results in a build-up of water at the cathode 14 of the fuel cell assembly 11. In addition, the by-product water formed within the fuel cell assembly 11 as a result of the reaction between the oxidant carried in oxidant channels 19 and the hydrogen ions migrating across the PEM 13 and the electrons migrating across the flow field plates, 17 and 18, also result in a build-up of water at the cathode 14. The coolant channels 21, however, serve to dispose of the excess water gathered at the cathode 14, as well as internally re-hydrating the PEM 13. This water management is typically accomplished through a balancing of pressures in the oxidant channels 19, coolant channels 21 and fuel channels 20. An oxidant is fed through the oxidant channels 19 and a fuel is fed through the fuel channels 20 at a pressure somewhat higher than the pressure of a coolant being fed through the coolant channels 21. With this arrangement, the excess water molecules at the cathode 14 of the fuel cell assembly 11 have a natural tendency to diffuse through the porous material of the cathode flow field plate 17 and into the coolant channels 21. Therefore, not only do the coolant channels 21 absorb excess water from the cathode 14 of the fuel cell assembly 11, but they also facilitate the diffusion of water molecules from the coolant channels 21, through the porous anode flow field plate 18, to thereby re-hydrate the anode side of the PEM 13. In this manner, a judicious balance of the pressures within the oxidant channels 19, the coolant channels 21 and the fuel channels 20 serves to provide an adequate supply of water at the anode 18, insures the hydration of the PEM 13 and purges any excess water built up at the cathode 14.

The coolant channels 21 of the fuel cell assembly 11 shown in FIG. 1 further provide for the thermal management of the fuel cell assembly 11, as well as the fuel cell stack 10 as a whole. By circulating about each fuel cell assembly 11 in a fuel cell stack 10, the water coolant carries away excess heat generated by the chemical reactions taking place within the fuel cell stack 10. The temperature of the fuel cell stack 10 can, therefore, be controlled by regulating the temperature and the flow of the coolant through the coolant channels 21.

In operation, it is desired that pure hydrogen be utilized as the fuel supply for the fuel cells 11 and 12 shown in FIG. 1, but such pure hydrogen is often expensive to obtain and store. Other hydrocarbons such as methane, natural gas and gasoline are therefore utilized as a fuel, but only after these hydrocarbons have undergone a known reformation process to convert the hydrocarbons to a hydrogen rich fuel having a minimal amount of impurities within the fuel supply.

Reformed hydrocarbon fuels, however, frequently contain quantities of ammonia, $NH_3$, and hydrogen, $H_2$, as well as significant quantities of carbon dioxide, $CO_2$. The $NH_3$ and $CO_2$ gases dissolve and dissociate into the water which is provided to, and created within, the fuel cell assembly. The gases react with the water and form ionic reaction by-products. The resultant contaminated water supply may cause the conductivity of the water to increase to a point where shunt current corrosion occurs in the coolant channels 21 and the coolant inlet and exhaust manifolds, 23 and 24 respectively. Over time, these increased shunt currents may be on the order of 10 times the magnitude present in fuel cells having water not so contaminated by a reformed hydrogen fuel. In addition to increased shunt currents, concentrations of ammonia even as small as 2 parts per million (ppm) can act to displace protons in the PEM 13, thereby reducing the conductivity of the PEM 13 and thus the efficiency of the fuel cell assembly as a whole. Dissolved gases within the coolant may also result in gas bubbles in the coolant flow field of the fuel cell stack 10 which may cause drying of the anode and cathode flow field plates, 18 and 17 respectively, thereby resulting in mixing of the reactants.

With $NH_3$ and $CO_2$ dissolved in the coolant, purifying the coolant water of a fuel cell stack 10 by utilizing only a demineralization apparatus, as illustrated in previously cited U.S. Pat. No. 4,344,850 would result in significantly increasing the water clean-up burden and is impractical, both in the size of the demineralizer required and in its economic cost. In addition, only a small portion of the water coolant, amounting to make-up water being added to the fuel cell stack, is treated in the U.S. Pat. No. 4,344,850.

While it should be readily apparent that utilizing water as a coolant within a fuel cell stack 10 is beneficial for the purposes of water and thermal management, problems arise when a fuel cell stack 10 so equipped experiences contamination of the water coolant. It would therefore be very beneficial to equip a fuel cell stack 10 with a water treatment system which compensates for the water contamination of the fuel cell stack 10 and prevents damage to the fuel cell stack 10 due to the resultant effects of such contamination, as discussed above.

Figure 4A:
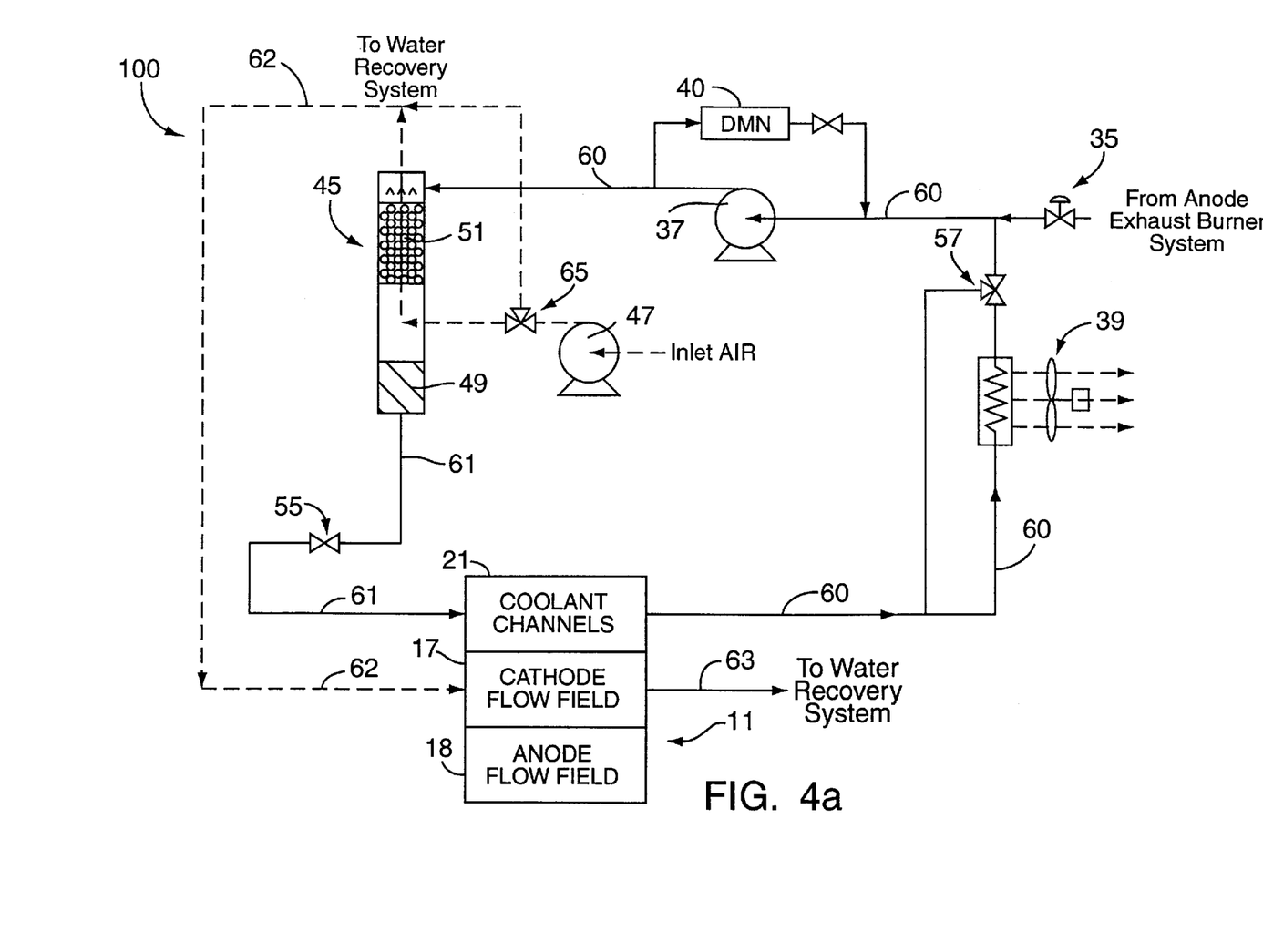
FIG. 4a is a simplified schematic illustration of a water treatment system according to one embodiment of the present invention.

It is a major aspect of the present invention, therefore, to provide such a water treatment system for a fuel cell stack 10. FIG. 4a illustrates one such water treatment system 100 according to one embodiment of the present invention. Only a single fuel cell assembly 11 is shown in FIG. 4a, including coolant channels 21, an anode flow field plate 18 and a cathode flow field plate 17, for simplicity; however, it will be readily apparent that the water treatment system 100 is operable with either a single fuel cell assembly 11 or a fuel cell stack 10.

Still in reference to FIG. 4a, a coolant conduit 60 carries exhausted coolant which has circulated through coolant channels 21 of the fuel cell assembly 11. In circulating through the fuel cell assembly 11, the coolant absorbs and carries away heat generated by the fuel cell assembly 11, as well as becoming contaminated with dissolved and dissociated gases and suspended solids. A thermal control valve 57 is situated along the coolant conduit 60 for selectively causing a measured amount of the circulated coolant to be fed to a coolant heat exchanger 39, comprising a fan apparatus or the like, which is operable to remove a portion of the absorbed heat from the circulated coolant. The circulated and condensed coolant is subsequently directed by a coolant pump 37 for delivery to a degasifier portion 51 of a degasifying apparatus 45.

The degasifying apparatus 45 of the present invention houses a reservoir portion 49 for storing purified coolant. An oxidant source apparatus 47, typically a variable speed blower-pump or the like, is the primary source of oxidant for the cathode flow field 17 of fuel cell assembly 11. In the embodiment shown in FIG. 4a, the oxidant source apparatus 47 does not provide the fuel cell assembly 11 with a supply of oxidant directly, but rather first provides the degasifying apparatus 45 with a supply of oxygen-rich oxidant, typically in the form of air. A coolant exit conduit 61 serves as a path for returning water treated by the degasifying apparatus 45 to the coolant channels 21 of the fuel cell assembly 11, while a trim valve 55 controls the pressure of the treated water which is returned to the coolant channels 21.

As is further illustrated in FIG. 4a, an oxidant control valve 65 may alternatively be arranged to feed only a fraction of the oxidant, typically approximately 3–7% of the total oxidant flow, to the degasifier portion 51, while the balance is fed directly to the cathode. An oxidant flow of approximately 3–7% is typically sufficient to reduce the level of dissolved gases in the coolant to an acceptable level, however the required oxidant flow may need to be correspondingly higher if fuel leakage into the coolant is excessive.

In operation, the water treatment system 100 of FIG. 4a delivers circulated coolant through the coolant conduit 60 to the degasifying apparatus 45. The circulated coolant passes through the degasifier portion 51 in a counter-current manner to the oxidant air which is introduced into the degasifying apparatus 45 below the degasifier portion 51 through the action of the oxidant source apparatus 47. Mass transfer in the degasifier portion 51 results in a significant fraction of the dissolved gases in the coolant diffusing into the oxidant stream, thus stripping most of the dissolved gases from the coolant. This results in a coolant with an acceptable conductivity and dissolved-gas content. In addition, the oxidant air will become humidified by the falling coolant, in a manner important to the operation of the fuel cell assembly 11, as discussed previously. The humidified oxidant is transported from the degasifying apparatus 45 by an oxidant exit conduit 62, to be subsequently supplied to the cathode flow field 17 of the fuel cell assembly 11. An exhausted oxidant stream, which has circulated through the oxidant channels 19 of the cathode flow field plate 17, is carried by an oxidant exhaust conduit 63 to be forwarded to an unillustrated water recovery system. The unillustrated water recovery system may include a condensing heat exchanger or other appropriate means for recovering water from the exhausted oxidant stream. Water condensed from an unillustrated anode exhaust burner system is selectively added to the coolant conduit 60 through the action of a condensate trim valve 35.

The degasifying apparatus 45 may be any known mass transfer device capable of effecting mass transfer between a liquid stream and a gas stream. Examples of such mass transfer devices are packed beds, wetted films, spray towers, or the like.

The water treatment system 100 shown in FIG. 4a also illustrates other coolant modification devices. A demineralizer 40 is utilized prior to the circulated coolant being introduced to the degasifying apparatus 45. The demineralizer 40 is provided with a predetermined amount of the circulated coolant in the coolant conduit 60 for the reduction of suspended and dissolved solids in the circulated coolant. The coolant heat exchanger 39 is located upstream of the demineralizer 40 so as to provide the circulated coolant at a temperature appropriate for proper functioning of the demineralizer 40, approximately 140° F. or less.

It should be readily apparent that the trim valves shown in FIG. 4a are controlled so as to maintain a balance between the heat generated in the fuel cell assembly 11 and the heat rejected to the environment. The coolant flow rates and the coolant temperatures at various locations within the water treatment system 100 are controlled to provide efficient operation of the fuel cell assembly 11 and the water treatment system 100.

The water treatment system of the present invention significantly reduces the amount of ammonia, carbon dioxide and hydrogen within the coolant stream of the fuel cell assembly 11 by treating the entire coolant stream. Consequently, according to a major aspect of the present invention, the buildup of these gases within the fuel cell assembly 11 can be reduced, as well as extending the time between maintenance on the demineralizer 40.

It is therefore a major aspect of the present invention that the oxidant processed by the degasifying apparatus 45 enables removal of the dissolved gases contaminating the circulated coolant, and moreover, that the oxidant supply subsequently provided to the cathode flow field plate 17 will have been previously humidified by the degasifying apparatus 45. In this manner, two considerations important to the operation of the fuel cell assembly 11 are accomplished utilizing a single integrated treatment system.

Figure 4B:
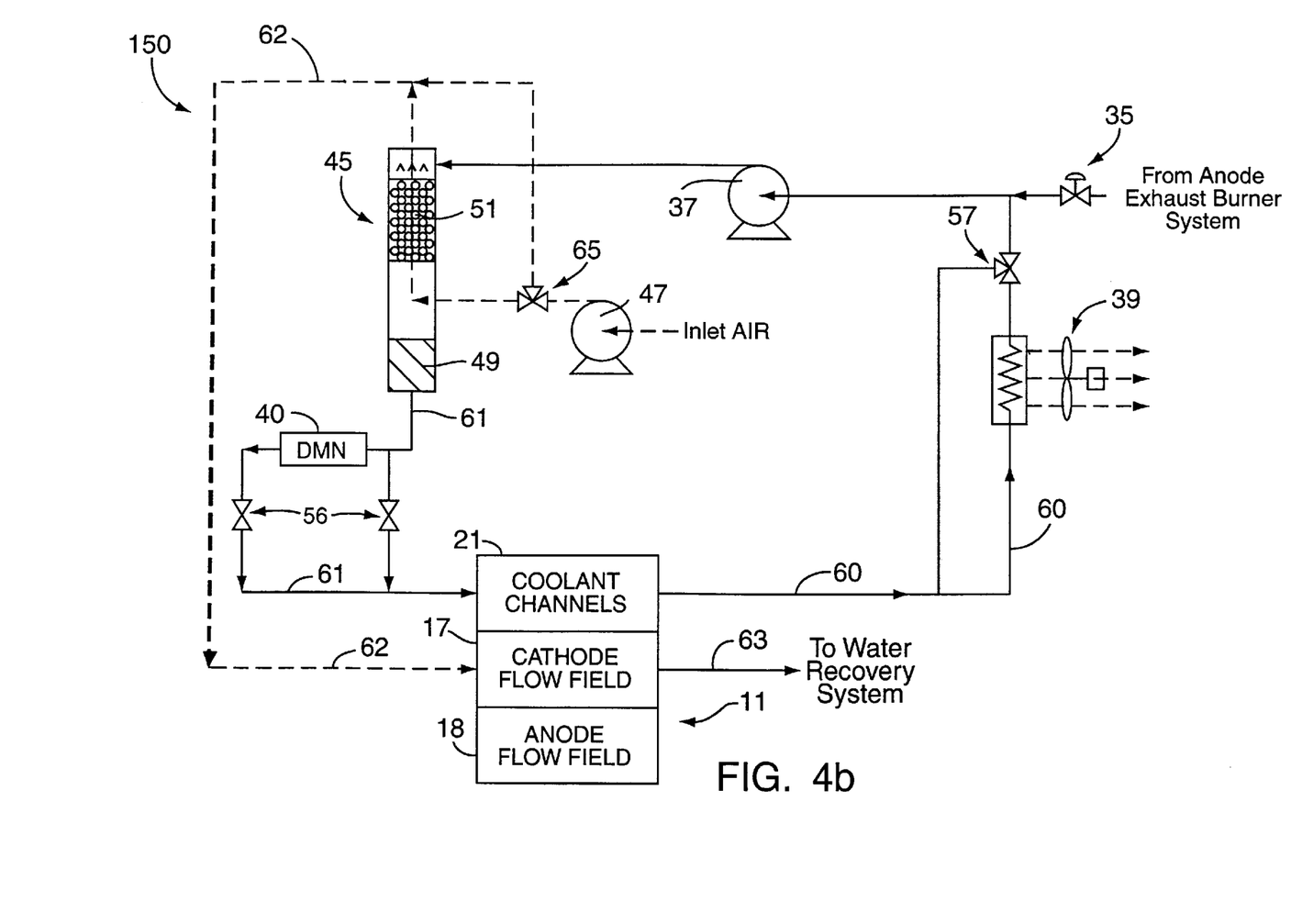
FIG. 4b is a simplified schematic illustration of a water treatment system according to another embodiment of the present invention.

FIG. 4b illustrates a water treatment system 150, according to another embodiment of the present invention. The operation of the water treatment system 150 is much the same as was described in conjunction with the water treatment system 100 of FIG. 4a. A coolant conduit 60 transports circulated and contaminated coolant to a degasifying apparatus 45 for interaction with an oxidant supply provided directly to the degasifying apparatus 45 by an oxidant source apparatus 47. The purified coolant and the now-humidified oxidant are then fed back to the coolant channels 21 and cathode flow field plate 17, respectively, of the fuel cell assembly 11.

As is further illustrated in FIG. 4b, an oxidant control valve 65 may alternatively be arranged to feed only a fraction of the oxidant, typically approximately 3–7% of the total oxidant flow, to the degasifier portion 51, while the balance is fed directly to the cathode. An oxidant flow of approximately 3–7% is typically sufficient to reduce the level of dissolved gases in the coolant to an acceptable level, however the required oxidant flow may need to be correspondingly higher if fuel leakage into the coolant is excessive.

In contrast to the water treatment system 100 of FIG. 4a, the water treatment system 150 passes the circulated coolant through a demineralizer 40 only after all of the circulated coolant has been purified by the degasifying apparatus 45. As can be seen in FIG. 4b, trim valves 56 are controlled so as to selectively divert a portion of the purified coolant from coolant reservoir 49 through a demineralizer 40, thereby removing suspended and dissolved solids from the coolant stream. By arranging the demineralizer 40 downstream from the degasifying apparatus 45, the water treatment system 150 further reduces the load upon the demineralizer 40 while correspondingly increasing the life of the demineralizer 40.

An exhausted oxidant stream, which has circulated through the oxidant channels 19 of the cathode flow field plate 17, is carried by an oxidant exhaust conduit 63 to be forwarded to an unillustrated water recovery system. The unillustrated water recovery system may include a condensing heat exchanger or other appropriate means for recovering water from the exhausted oxidant stream. Water condensed from an unillustrated anode exhaust burner system is selectively added to the coolant conduit 60 through the action of a condensate trim valve 35.

Figure 5A:
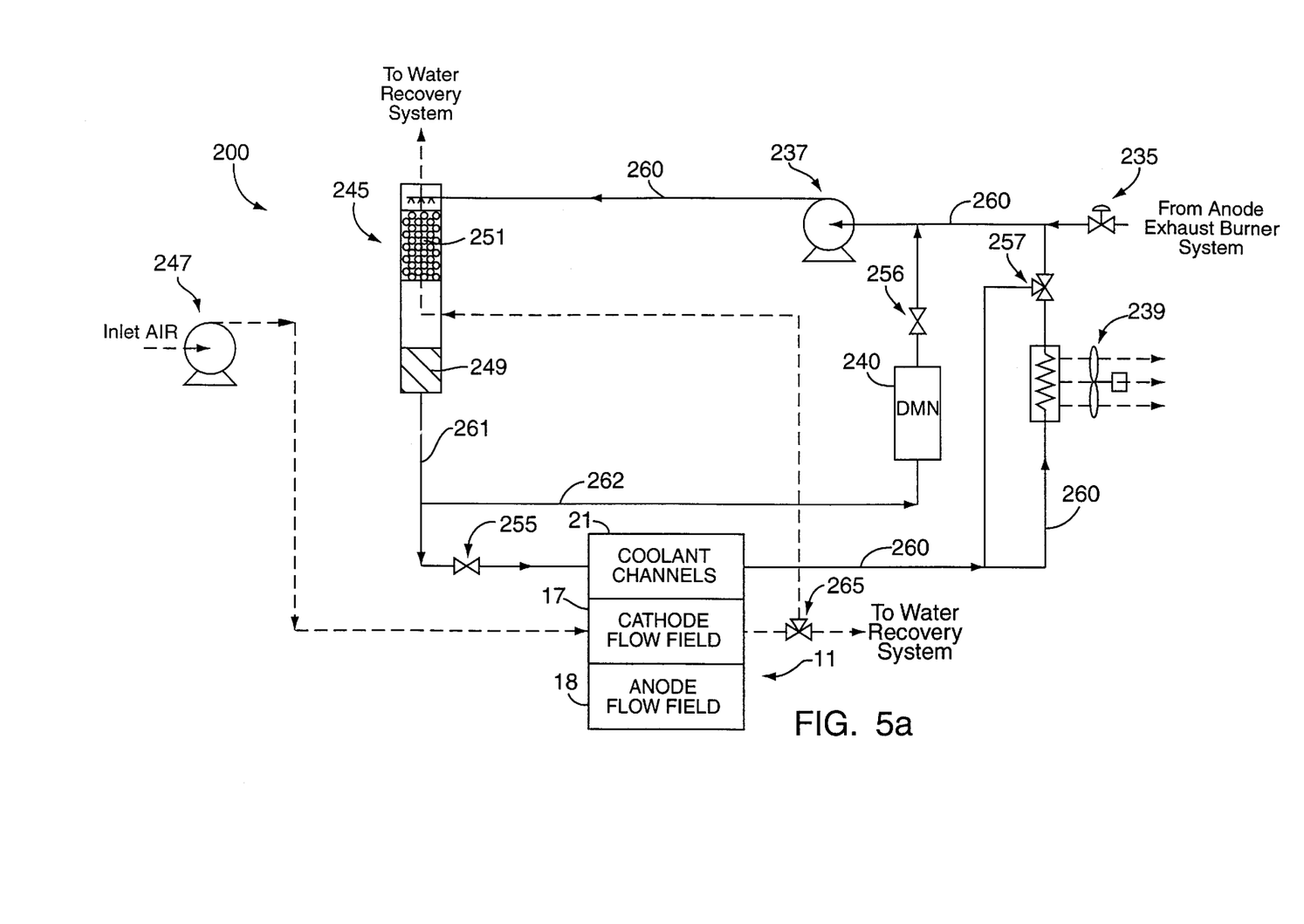
FIG. 5a is a simplified schematic illustration of a water treatment system according to a preferred embodiment of the present invention.

FIG. 5a illustrates a water treatment system 200 according to a preferred embodiment of the present invention. Only a single fuel cell assembly 11 is shown in FIG. 5a, including coolant channels 21, an anode flow field plate 18 and a cathode flow field plate 17, for simplicity; however, it will be readily apparent that the water treatment system 200 is operable with either a single fuel cell assembly 11 or a fuel cell stack 10.

Still in reference to FIG. 5a, a coolant conduit 260 carries exhausted coolant which has circulated through coolant channels 21 of the fuel cell assembly 11. In circulating through the fuel cell assembly 11, the coolant absorbs and carries away heat generated by the fuel cell assembly 11, as well as becoming contaminated with dissolved and dissociated gases and suspended solids. A thermal control valve 257 is situated along the coolant conduit 260 for selectively causing a measured amount of the circulated coolant to be fed to a coolant heat exchanger 239, comprising a fan apparatus or the like, which is operable to remove a portion of the absorbed heat from the circulated coolant. Water condensate from an unillustrated anode exhaust burner system is selectively added to the coolant conduit 260 through the action of a condensate trim valve 235, while the circulated and condensed coolant is subsequently directed by a coolant pump 237 for delivery to a degasifier portion 251 of a degasifying apparatus 245.

The degasifying apparatus 245 of the preferred embodiment houses a reservoir portion 249 for storing purified coolant. An oxidant source apparatus 247, typically a variable speed blower-pump or the like, is the primary source of oxidant for the cathode flow field plate 17 of fuel cell assembly 11. As opposed to the embodiment described in conjunction with FIGS. 4a and 4b, the oxidant source apparatus 247 provides the cathode 17 of the fuel cell assembly 11 with a supply of oxygen-rich oxidant directly. A coolant exit conduit 261 serves as a path for returning water treated by the degasifying apparatus 245 to the coolant channels 21 of the fuel cell assembly 11. A trim valve 255 controls the pressure of the treated water which is returned to the coolant channels 21.

In operation, the water treatment system 200 of FIG. 5a delivers all of the circulated coolant through the coolant conduit 260 to the degasifying apparatus 245. The circulated coolant passes through the degasifier portion 251 in a counter-current manner to the oxidant air which has been exhausted by the cathode flow field plate 17 and introduced into the degasifying apparatus 245 below the degasifier portion 251. Mass transfer in the degasifier portion 251 results in a significant fraction of the dissolved gases in the coolant diffusing into the oxidant stream, thus stripping most of the dissolved gases from the coolant. This process results in a coolant with an acceptable conductivity and dissolved-gas content, while the now-contaminated oxidant stream is exhausted to an unillustrated water recovery system. The unillustrated water recovery system may include a condensing heat exchanger or other appropriate means for recovering water from the exhausted oxidant stream. Water condensed from an unillustrated anode exhaust burner system is selectively added to the coolant conduit 260 through the action of a condensate trim valve 235.

The degasifying apparatus 245 may be any known mass transfer device capable of effecting mass transfer between a liquid stream and a gas stream. Examples of such mass transfer devices are packed beds, wetted films, spray towers, or the like.

As is further illustrated in FIG. 5a, an oxidant control valve 265 may alternatively be arranged to feed only a fraction of the exhausted oxidant, typically approximately 3–7% of the total oxidant flow, to the degasifier portion 251, while the balance is fed directly to the unillustrated water recovery system. An oxidant flow of approximately 3–7% is typically sufficient to reduce the level of dissolved gases in the coolant to an acceptable level, however the required oxidant flow may need to be correspondingly higher if fuel leakage into the coolant is excessive.

The water treatment system 200 shown in FIG. 5a also illustrates other coolant modification devices. A demineralizer 240 is supplied through a trim conduit 262 with a portion of the purified coolant, according to the action of a coolant trim valve 256, for the reduction of suspended and dissolved solids in the purified coolant. By arranging the demineralizer 240 downstream from the degasifying apparatus 245, the water treatment system 200 further reduces the load upon the demineralizer 240 while correspondingly increasing the life of the demineralizer 240. The coolant heat exchanger 239 is located upstream of the demineralizer 240 so as to provide the circulated coolant at a temperature appropriate for proper functioning of the demineralizer 240, approximately 140° F. or less. As discussed above, the demineralizer 240 removes suspended and dissolved solids from the coolant stream.

It should be readily apparent that the trim valves shown in FIG. 5a are controlled so as to maintain a balance between the heat generated in the fuel cell assembly 11 and the heat rejected to the environment. The coolant flow rates and the coolant temperatures at various locations within the water treatment system 200 are controlled to provide efficient operation of the fuel cell assembly 11 and the water treatment system 200.

It is a major aspects of the preferred embodiment of FIG. 5a that all of the circulated coolant be subjected to a degasification process each time before being presented to the fuel cell assembly 11 or the demineralizer 240. Not only will this arrangement ensure improved cleansing of any dissolved gases from the coolant stream, and therefore improved fuel cell operation and longevity, but the demineralizer 240 will also enjoy a longer usable life span due to the reduction in contaminants the demineralizer 240 must filter.

The water treatment system of FIG. 5a significantly reduces the amount of ammonia, carbon dioxide and hydrogen within the coolant stream of the fuel cell assembly 11. Consequently, according to a major aspect of the present invention, buildup of these gases within the fuel cell assembly 11 can be reduced, as well as extending the time between maintenance on the demineralization apparatus 240.

Figure 5B:
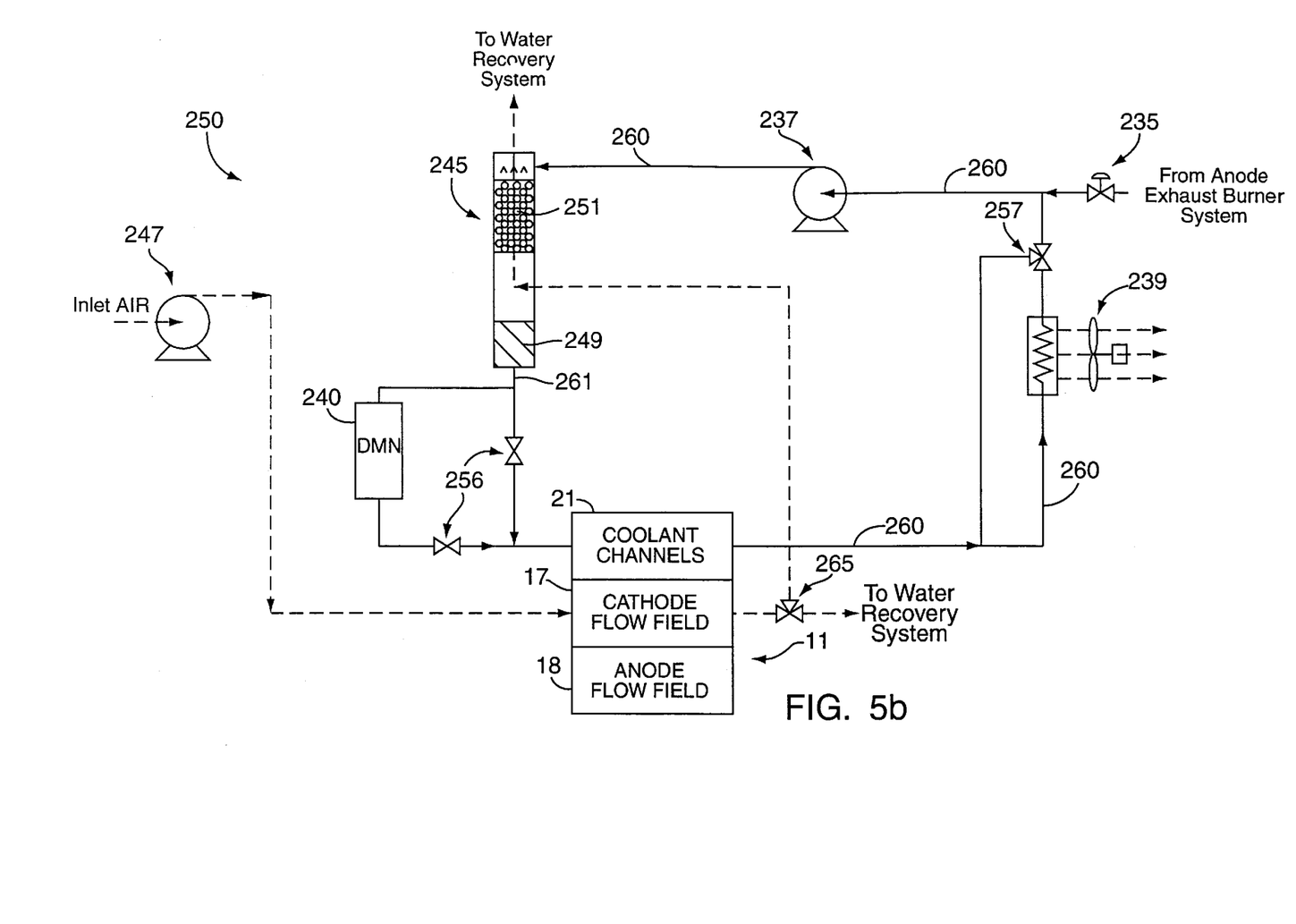
FIG. 5b is a simplified schematic illustration of a water treatment system according to another embodiment of the present invention.

FIG. 5b illustrates a water treatment system 250, according to another embodiment of the present invention. The operation of the water treatment system 250 is much the same as was described in conjunction with the water treatment system 200 of FIG. 5a. A coolant conduit 260 transports circulated and contaminated coolant to a degasifying apparatus 245 for interaction with an oxidant supply provided to the degasifying apparatus 245 from the cathode flow field plate 17 exhaust of the fuel cell assembly 11. The purified coolant is then fed back to the coolant channels 21 of the fuel cell assembly 11.

As is further illustrated in FIG. 5b, an oxidant control valve 265 may alternatively be arranged to feed only a fraction of the exhausted oxidant, typically approximately 3–7% of the total oxidant flow, to the degasifier portion 251, while the balance is fed directly to an unillustrated water recovery system. An oxidant flow of approximately 3–7% is typically sufficient to reduce the level of dissolved gases in the coolant to an acceptable level, however the required oxidant flow may need to be correspondingly higher if fuel leakage into the coolant is excessive.

In operation, the water treatment system 250 passes the circulated coolant through a demineralizer 240 only after all of the circulated coolant has been purified by the degasifying apparatus 245. As can be seen in FIG. 5b, trim valves 256 are controlled so as to selectively divert a portion of the purified coolant from coolant reservoir 249 through a demineralizer 240, thereby removing suspended and dissolved solids from the coolant stream. By arranging the demineralizer 240 downstream from the degasifying apparatus 245, the water treatment system 250 further reduces the load upon the demineralizer 240 while correspondingly increasing the life of the demineralizer 240.

As opposed to the water treatment apparatus 200 of FIG. 5a, the output of the demineralizer 240 is provided to the coolant channels 21 of the fuel cell assembly 11, instead of at a point along the coolant channel 260 upstream of the degasifying apparatus 245.

Also, it should be noted that in FIGS. 4a–5b only a single coolant pump 37/237 is utilized, as opposed to prior art arrangements. As such, a single coolant pump reduces both the complexity and the operating costs of the coolant treatment systems.

It should be readily apparent that while anode and cathode flow field plates having coolant channels formed therein has been described, the present invention is not limited in this regard as the coolant channels may be formed in either the anode or the cathode electrodes themselves without departing from the broader aspects of the present invention.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A water treatment system for a fuel cell stack having a plurality of electrochemical fuel cell assemblies being in electrical connection with each other, said fuel cell assemblies each having an electrolyte, an anode, a cathode, each of said anode and said cathode are adapted to support anode and cathode flow field plates through which flows of fuel and oxidant are circulated to said anode and said cathode, respectively, one of said anode and cathode flow field plates being adapted to support a coolant channel having coolant inlet and exhaust manifolds through which a supply of coolant is circulated, said system comprising:

a coolant conduit for exhausting said circulated coolant from said fuel cell stack;

an oxidant source generator for providing said fuel cell stack with said oxidant;

a degasifying apparatus, including a coolant exit conduit and an oxidant exit conduit, which accepts said circulated coolant and said oxidant for subsequent interaction with one another thereby treating both said circulated coolant and said oxidant by removing contaminants from said circulated coolant and by humidifying said oxidant; and wherein said degasifying apparatus provides said fuel cell stack with said treated coolant and said treated oxidant.

2. The water treatment system for a fuel cell stack according to claim 1, wherein:

said degasifying apparatus further comprises:

an oxidant inlet for accepting said oxidant from said oxidant source generator prior to said fuel cell stack being provided with said oxidant;

a degasifier portion to which said circulated coolant and said oxidant are provided, said degasifier portion enabling said interaction between said circulated coolant and said oxidant to thereby treat said circulated coolant by removing dissolved gases from said circulated coolant while humidifying said oxidant; and a reservoir portion for collecting said treated coolant.

3. The water treatment system for a fuel cell stack according to claim 2, wherein:

said coolant comprises water; and said dissolved gasses comprise at least one of ammonia, carbon dioxide and hydrogen gases.

4. The water treatment system for a fuel cell stack according to claim 2, wherein:

said coolant exit conduit provides said fuel cell stack with said treated coolant from said reservoir portion; and said oxidant exit conduit provides said fuel cell stack with said humidified oxidant.

5. The water treatment system for a fuel cell stack according to claim 4, wherein:

said water treatment system further comprises:

a coolant heat exchanger located along said coolant conduit upstream of said degasifying apparatus for removing heat from said circulated coolant;

a demineralization device located along said coolant conduit upstream of said degasifying apparatus for purifying a portion of said circulated coolant; and a coolant pump located along said coolant conduit upstream of said degasifying apparatus for providing said degasifier portion with said circulated coolant.

6. The water treatment system for a fuel cell stack according to claim 4, wherein:

said water treatment system further comprises:

a coolant heat exchanger located along said coolant conduit upstream of said degasifying apparatus for removing heat from said circulated coolant;

a demineralization device located along said coolant exit conduit downstream of said degasifying apparatus for purifying a portion of said circulated coolant; and a coolant pump located along said coolant conduit upstream of said degasifying apparatus for providing said degasifier portion with said circulated coolant.

7. The water treatment system for a fuel cell stack according to claim 6, wherein:

said coolant heat exchanger comprises a fan apparatus; and said oxidant source generator comprises a pump for providing an air oxidant.

8. A water treatment system for a fuel cell stack having a plurality of electrochemical fuel cell assemblies being in electrical connection with each other, said fuel cell assemblies each having an electrolyte, an anode, a cathode, each of said anode and said cathode are adapted to support anode and cathode flow field plates through which flows of fuel and oxidant are circulated to said anode and said cathode, respectively, one of said anode and cathode flow field plates being adapted to support a coolant channel having coolant inlet and exhaust manifolds through which a flow of coolant is circulated, said system comprising:

a coolant conduit for exhausting said circulated coolant from said fuel cell stack;

an oxidant source generator for providing said fuel cell stack with said oxidant, said oxidant being exhausted from said fuel cell stack after circulation through said fuel cell stack;

a degasifying apparatus, including a coolant exit conduit and an oxidant exit conduit, which accepts said circulated coolant and said exhausted oxidant for subsequent interaction with one another thereby treating said circulated coolant by removing contaminants from said circulated coolant;

a trim conduit for diverting a portion of said treated coolant from said coolant exit conduit;

a demineralization device located along said trim conduit downstream of said degasifying apparatus but upstream of said fuel cell stack for purifying the portion of said treated coolant; and wherein said degasifying apparatus provides said fuel cell stack with said treated coolant.

9. The water treatment system for a fuel cell stack according to claim 8, wherein:

said degasifying apparatus further comprises:

an exhausted oxidant inlet for accepting said exhausted oxidant from said fuel cell stack;

a degasifier portion to which said circulated coolant and said exhausted oxidant are provided, said degasifier portion enabling said interaction between said circulated coolant and said exhausted oxidant to thereby treat said circulated coolant by removing dissolved gases from said circulated coolant; and a reservoir portion for collecting said treated coolant.

10. The water treatment system for a fuel cell stack according to claim 9, wherein:
   said coolant comprises water; and
   said dissolved gasses comprise at least one of ammonia, carbon dioxide and hydrogen gases.

11. The water treatment system for a fuel cell stack according to claim 9, wherein:
   said coolant exit conduit provides said fuel cell stack with said treated coolant from said reservoir portion; and
   said oxidant exit conduit vents said exhausted oxidant from said degasifying apparatus.

12. The water treatment system for a fuel cell stack according to claim 11, wherein:
   said water treatment system further comprises:
   a coolant heat exchanger located along said coolant conduit upstream of said degasifying apparatus for removing heat from said circulated coolant; and
   a coolant pump located along said coolant conduit upstream of said degasifying apparatus for providing said degasifier portion with said circulated coolant.

13. The water treatment system for a fuel cell stack according to claim 11, wherein:
   said water treatment system further comprises:
   a coolant heat exchanger located along said coolant conduit upstream of said degasifying apparatus for removing heat from said circulated coolant;
   a coolant pump located along said coolant conduit upstream of said degasifying apparatus for providing said degasifier portion with said circulated coolant; and
   wherein said portion of said purified coolant is merged with said treated coolant prior to being provided to said fuel cell stack.

14. The water treatment system for a fuel cell stack according to claim 13, wherein:
   said coolant heat exchanger comprises a fan apparatus; and
   said oxidant source generator comprises a pump for providing an air oxidant.

15. A method of providing a water treatment system to a fuel cell stack having a plurality of electrochemical fuel cell assemblies being in electrical connection with each other, said fuel cell assemblies each having an electrolyte, an anode, a cathode, each of said anode and said cathode are adapted to support anode and cathode flow field plates through which flows of fuel and oxidant are circulated to said anode and said cathode, respectively, one of said anode and cathode flow field plates being adapted to support a coolant channel having coolant inlet and exhaust manifolds through which a flow of coolant is circulated, said method comprising the steps of:
   exhausting said circulated coolant from said fuel cell stack;
   generating an oxidant supply;
   providing a degasifying apparatus with said exhausted coolant and said generated oxidant, said generated oxidant being directed to said degasifying apparatus prior to said fuel cell stack being provided with said generated oxidant; and
   operating said degasifying apparatus so as to remove contaminants from said exhausted coolant.

16. The method of providing a water treatment system to a fuel cell stack according to claim 15, further comprising the steps of:
   providing a degasifier portion of said degasifying apparatus with said generated oxidant and said exhausted coolant to thereby treat said exhausted coolant by removing dissolved gasses from said exhausted coolant while humidifying said generated oxidant; and
   arranging a demineralization device upstream of said degasifying apparatus for purification of said exhausted coolant.

17. The method of providing a water treatment system to a fuel cell stack according to claim 15, further comprising the steps of:
   providing a degasifier portion of said degasifying apparatus with said generated oxidant and said exhausted coolant to thereby treat said exhausted coolant by removing dissolved gasses from said exhausted coolant while humidifying said generated oxidant; and
   arranging a demineralization device downstream of said degasifying apparatus for purification of said treated coolant.

18. A method of providing a water treatment system to a fuel cell stack having a plurality of electrochemical fuel cell assemblies being in electrical connection with each other, said fuel cell assemblies each having an electrolyte, an anode, a cathode, each of said anode and said cathode are adapted to support anode and cathode flow field plates through which flows of fuel and oxidant are circulated to said anode and said cathode, respectively, one of said anode and cathode flow field plates being adapted to support a coolant channel having coolant inlet and exhaust manifolds through which a flow of coolant is circulated, said method comprising the steps of:
   exhausting said circulated coolant from said fuel cell stack;
   exhausting said circulated oxidant from said fuel cell stack;
   providing a degasifier portion of a degasifying apparatus with said exhausted oxidant and said exhausted coolant to thereby treat said exhausted coolant by removing dissolved gasses from said exhausted coolant while venting said exhausted oxidant;
   arranging a demineralization device downstream of said degasifying apparatus for purification of a portion of said treated coolant; and
   wherein said portion of said purified coolant is merged with said treated coolant prior to being provided to said fuel cell stack.

* * * * *